United States Patent
Hanssen et al.

(10) Patent No.: US 6,874,219 B2
(45) Date of Patent: Apr. 5, 2005

(54) SYSTEM, METHOD, AND APPARATUS FOR PREVENTING ROTATION OF A DISK CLAMP WHILE BEING ASSEMBLED TO THE HUB OF A SPINDLE MOTOR IN A HARD DISK DRIVE AND FASTENER CENTERING FEATURES

(75) Inventors: Steven Alf Hanssen, San Jose, CA (US); Jr-Yi Shen, Cupertino, CA (US); Emmanuel N. Tatarakis, San Jose, CA (US); Stanley Yen Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 43 days.

(21) Appl. No.: 10/443,904

(22) Filed: May 22, 2003

(65) Prior Publication Data

US 2004/0231133 A1 Nov. 25, 2004

(51) Int. Cl.[7] .............................. B23P 11/00; B25B 27/14
(52) U.S. Cl. ..................... 29/525.11; 29/271; 29/281.1; 29/466; 29/603.03; 29/759; 29/760; 269/52; 269/900; 360/99.12
(58) Field of Search .............................. 29/603.03, 464, 29/466, 525.01, 525.11, 33 K, 758, 759, 760, 243.517, 271, 281.1, 894.361; 269/47, 52, 900; 360/99.12

(56) References Cited

U.S. PATENT DOCUMENTS

| | | | | | |
|---|---|---|---|---|---|
| 2,848,798 | A | * | 8/1958 | Davis ........................... | 29/271 |
| 3,203,082 | A | * | 8/1965 | Miller ......................... | 228/170 |
| 4,209,891 | A | * | 7/1980 | Lamb et al. .................. | 29/466 |
| 4,224,648 | A | * | 9/1980 | Roling ..................... | 360/99.12 |
| 4,345,149 | A | * | 8/1982 | Blaser ................... | 250/231.14 |
| 4,541,163 | A | * | 9/1985 | Eiting ....................... | 29/426.5 |
| 4,741,090 | A | * | 5/1988 | Monnier ....................... | 29/464 |
| 4,768,279 | A | * | 9/1988 | Lafferty .................... | 29/525.11 |
| 5,642,641 | A | * | 7/1997 | Maxfield et al. .............. | 72/358 |
| 5,666,724 | A | * | 9/1997 | Kolsun ..................... | 29/888.02 |
| 5,713,118 | A | * | 2/1998 | Swann et al. .................. | 29/283 |
| 6,305,061 | B1 | * | 10/2001 | King ........................... | 29/259 |
| 6,415,491 | B1 | * | 7/2002 | Klann ......................... | 29/259 |
| 6,464,045 | B2 | * | 10/2002 | Weber et al. ............. | 188/18 A |
| 6,557,234 | B1 | * | 5/2003 | Hagiwara et al. ............. | 29/433 |
| 6,603,636 | B2 | * | 8/2003 | Schwandt et al. ....... | 360/99.12 |
| 6,643,907 | B2 | * | 11/2003 | Hagiwara et al. ............. | 29/433 |
| 6,690,637 | B1 | * | 2/2004 | Codilian .................. | 360/99.12 |
| 6,718,634 | B1 | * | 4/2004 | Sadanowicz et al. .. | 29/894.361 |
| 2002/0024763 | A1 | * | 2/2002 | Drake et al. ............. | 360/99.12 |
| 2002/0069509 | A1 | * | 6/2002 | Choo et al. .............. | 29/603.03 |
| 2002/0109776 | A1 | * | 8/2002 | Berg et al. ..................... | 348/95 |

FOREIGN PATENT DOCUMENTS

GB        2220174 A  *  1/1990  ........... B60B/29/00

* cited by examiner

Primary Examiner—Essama Omgba
(74) Attorney, Agent, or Firm—Bracewell & Patterson, L.L.P.

(57) ABSTRACT

A disk clamp for securing disks to the hub of a spindle motor in a disk drive has symmetrically spaced apart countersunk apertures in the top surface of the disk clamp. The apertures enable the disk clamp to maintain a proper orientation before the fasteners are attached. This design overcomes issues related to rotation and displacement of the clamp while it is being fastened to the hub, and reduces the complexity of the tooling and fixtures required to complete the assembly. Less tooling complexity also allows multi-fastener driver systems to be employed so that all of the fasteners required to complete the assembly may be simultaneously attached arid driven into the disk clamp. The countersunk apertures on the disk clamp are designed to couple with tapered sleeves on the installation tool to quickly and precisely center the fasteners in the disk clamp while providing anti-rotation torque for the disk clamp.

15 Claims, 4 Drawing Sheets

SYSTEM, METHOD, AND APPARATUS FOR PREVENTING ROTATION OF A DISK CLAMP WHILE BEING ASSEMBLED TO THE HUB OF A SPINDLE MOTOR IN A HARD DISK DRIVE AND FASTENER CENTERING FEATURES

BACKGROUND OF THE INVENTION

1. Technical Field

The present invention relates in general to an improved hard disk drive and, in particular, to an improved system, method, and apparatus for attaching a disk clamp to the hub of a spindle motor in a hard disk drive that prevents rotation of the clamp and enhances the ability to center fasteners for the assembly thereof.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The attachment of the data storage disks to the hub of the spindle motor is accomplished via a disk clamp. The disk clamp retains the disks on the hub by attaching directly to the hub of the motor. In the prior art, screws are typically used to fasten the disk clamp to the hub. However, during assembly of the disk pack and spindle motor, the torque applied to the screws also tends to rotate and displace the disk clamp relative to the hub, thereby causing misalignments. Moreover, very precise and expensive tooling is required to properly center and align the screws with the holes in the disk clamps and hubs. One example of a prior art disk clamp design is shown in FIG. 6. The disk clamp 11 is provided with a conventional stair-stepped hole 13 which allows the head 15 of the screw 17 to be located within the disk clamp 11 below its top surface 19. Although this design is workable, it experiences all of the previously described problems that are typical of prior art solutions. Thus, an improved system, method, and apparatus for attaching a disk clamp to the hub of a spindle motor in a hard disk drive that overcomes these problems would be desirable.

SUMMARY OF THE INVENTION

One embodiment of a disk clamp for securing data storage disks to the hub of a spindle motor in a hard disk drive solves a number of problems over prior art designs. The present invention overcomes issues related to rotation and displacement of the clamp while it is being fastened to the hub of the spindle motor by providing a plurality of symmetrically spaced apart countersunk apertures in the top surface of the disk clamp. These apertures enable the disk clamp to maintain a proper orientation before the fasteners are attached. The present design also reduces the complexity of the tooling and fixtures required to complete the assembly. In addition, the overall part cost is reduced because additional, prior art tooling holes are no longer required. Moreover, less tooling complexity also allows multi-fastener driver systems to be employed so that all of the fasteners required to complete the assembly may be simultaneously attached and driven into the disk clamp. The countersunk apertures on the disk clamp are designed to couple with tapered sleeves on the installation tool to quickly and precisely center the fasteners in the disk clamp while providing anti-rotation torque for the disk clamp when the installation tool torques the fasteners.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
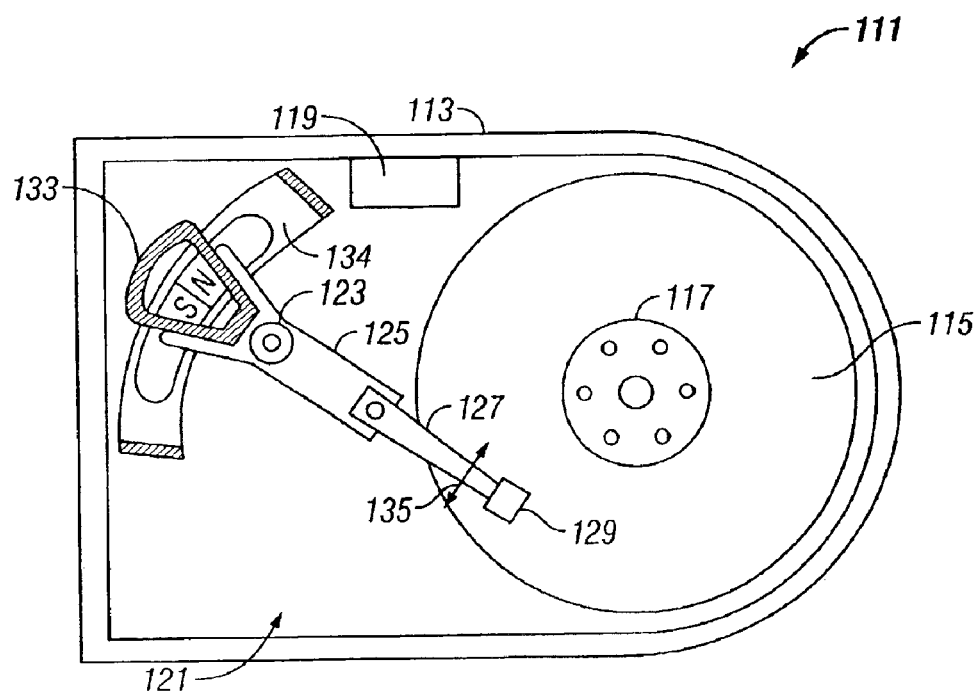
FIG. 1 is a simplified plan view of one embodiment of a hard disk drive constructed in accordance with the present invention.
Figure 6:
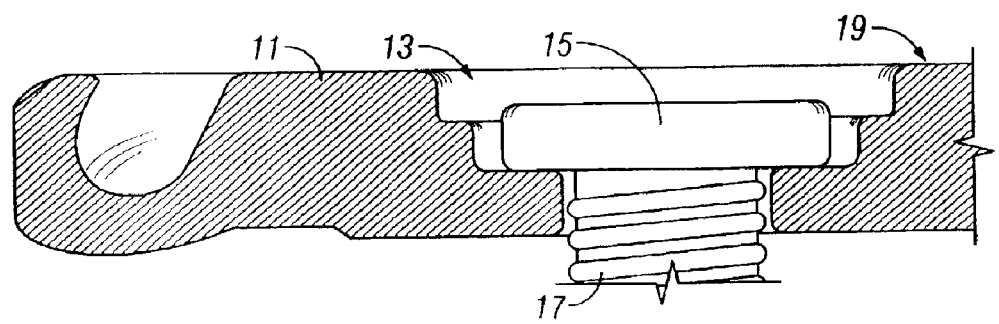
FIG. 6 is an enlarged sectional side view of a portion of a prior art disk clamp and hub assembly.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub assembly 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal, assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
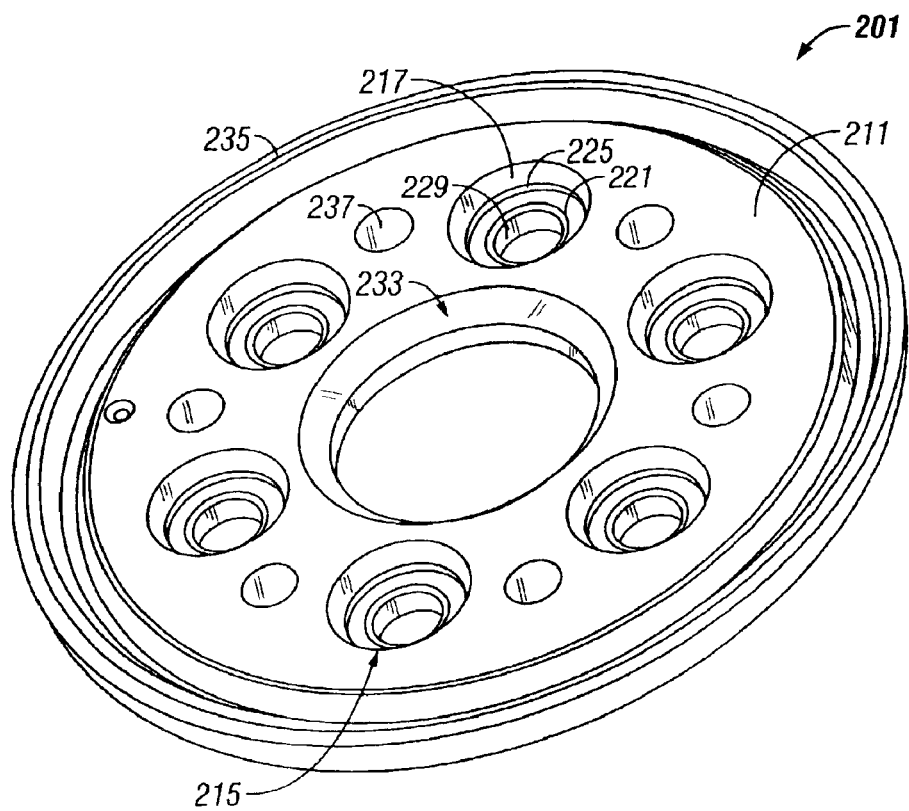
FIG. 2 is an upper isometric view of one embodiment of a disk clamp utilized by the hard disk drive of FIG. 1 and is constructed in accordance with the present invention.
Figure 3:
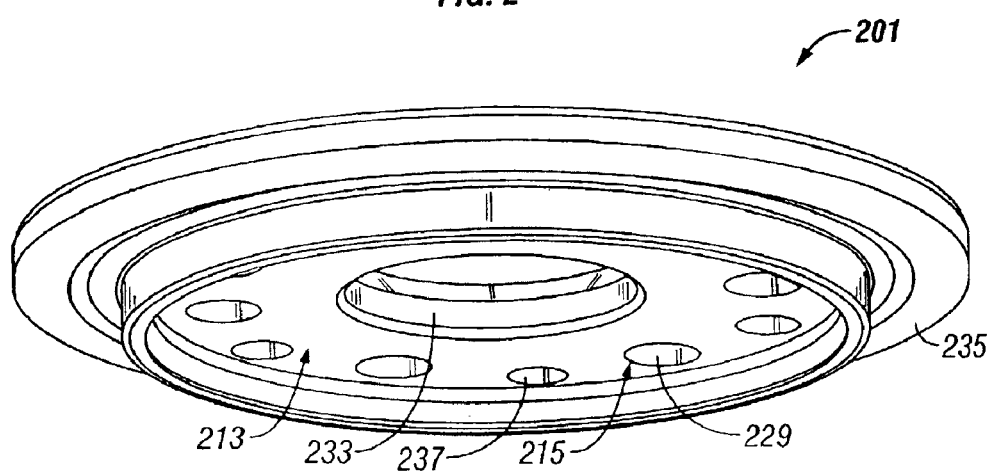
FIG. 3 is a lower isometric view of the disk clamp of FIG. 2 and is constructed in accordance with the present invention.
Figure 4:
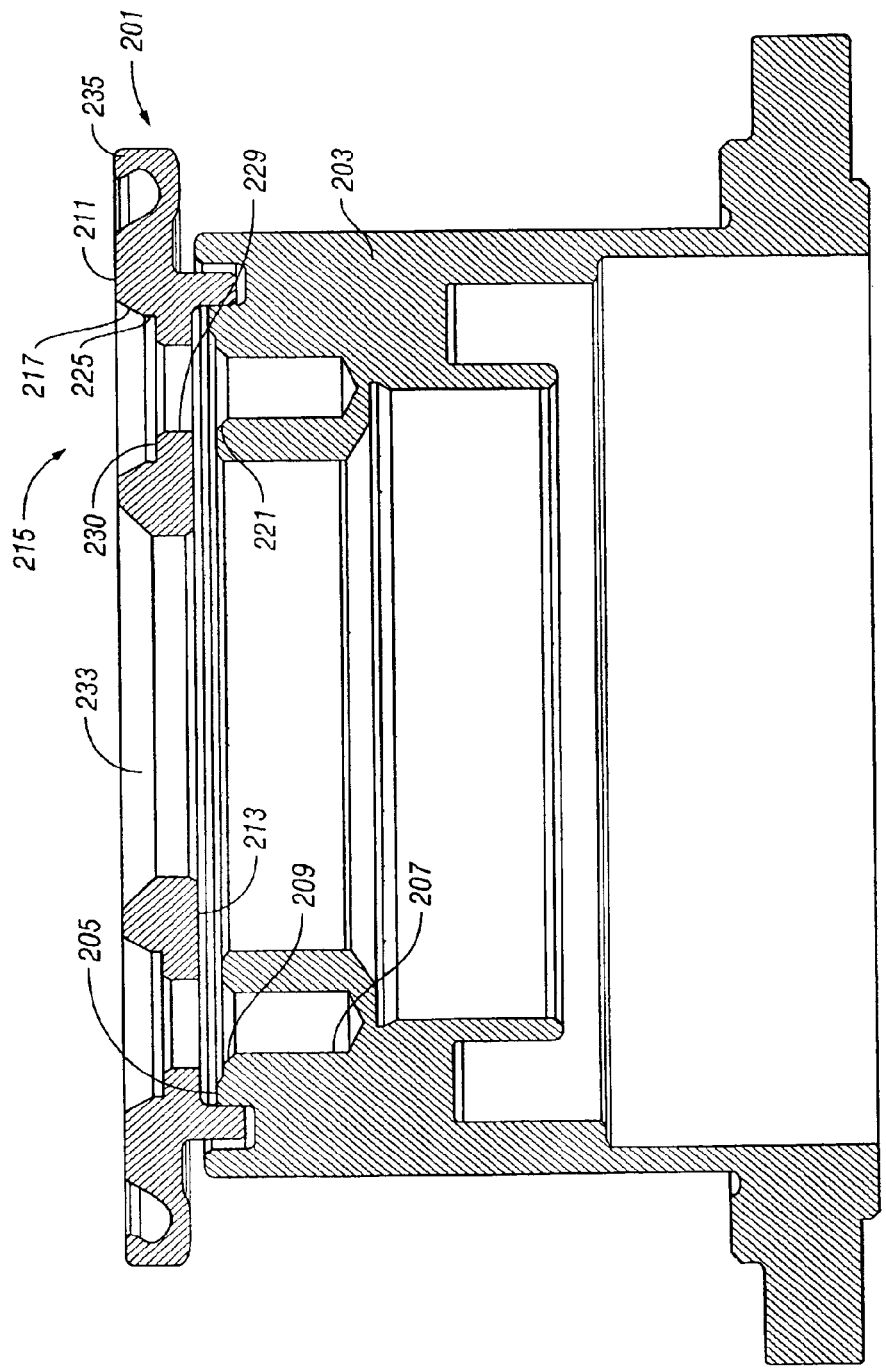
FIG. 4 is a sectional side view of the disk clamp of FIG. 2 mounted to the hub of a spindle motor in the hard disk drive of FIG. 1 and is constructed in accordance with the present invention.

Referring now to FIGS. 2–5, a system, method, and apparatus for preventing the displacement or rotation of a disk clamp 201 while the disk clamp 201 is being assembled to a hub 203 (FIG. 4) of a spindle motor (not shown) in the hard disk drive 111 is disclosed. The hub 203 of the spindle motor has a hub surface 205 and a plurality of holes 207 (e.g., six) that, in one embodiment, are threaded. The holes 207 are formed in the hub surface 205, and the holes 207 are symmetrically spaced apart from each other and may be provided with countersinks 209 at hub surface 205. As shown in FIG. 4, the hub 203 also has a number of internal and external features for the various elements (not shown) of the spindle motor assembly.

The disk clamp 201 has first and second opposed surfaces 211, 213, (compare FIGS. 2 and 3) and a plurality of apertures 215 extending completely therethrough. The apertures 215 are symmetrically spaced apart from each other and axially register with respective ones of the holes 207 in the hub 203 when the second surface 213 of the disk clamp 201 is positioned on or adjacent to the hub surface 205 of the hub 203. In operation, it is only the curved lower portion at the outer end of the disk clamp 201 that makes contact with the uppermost disk in the disk pack assembly, such that second surface 213 is spaced apart from the upper end of the hub 203. The remaining disks (if any) may be spaced apart by spacers.

Figure 5:
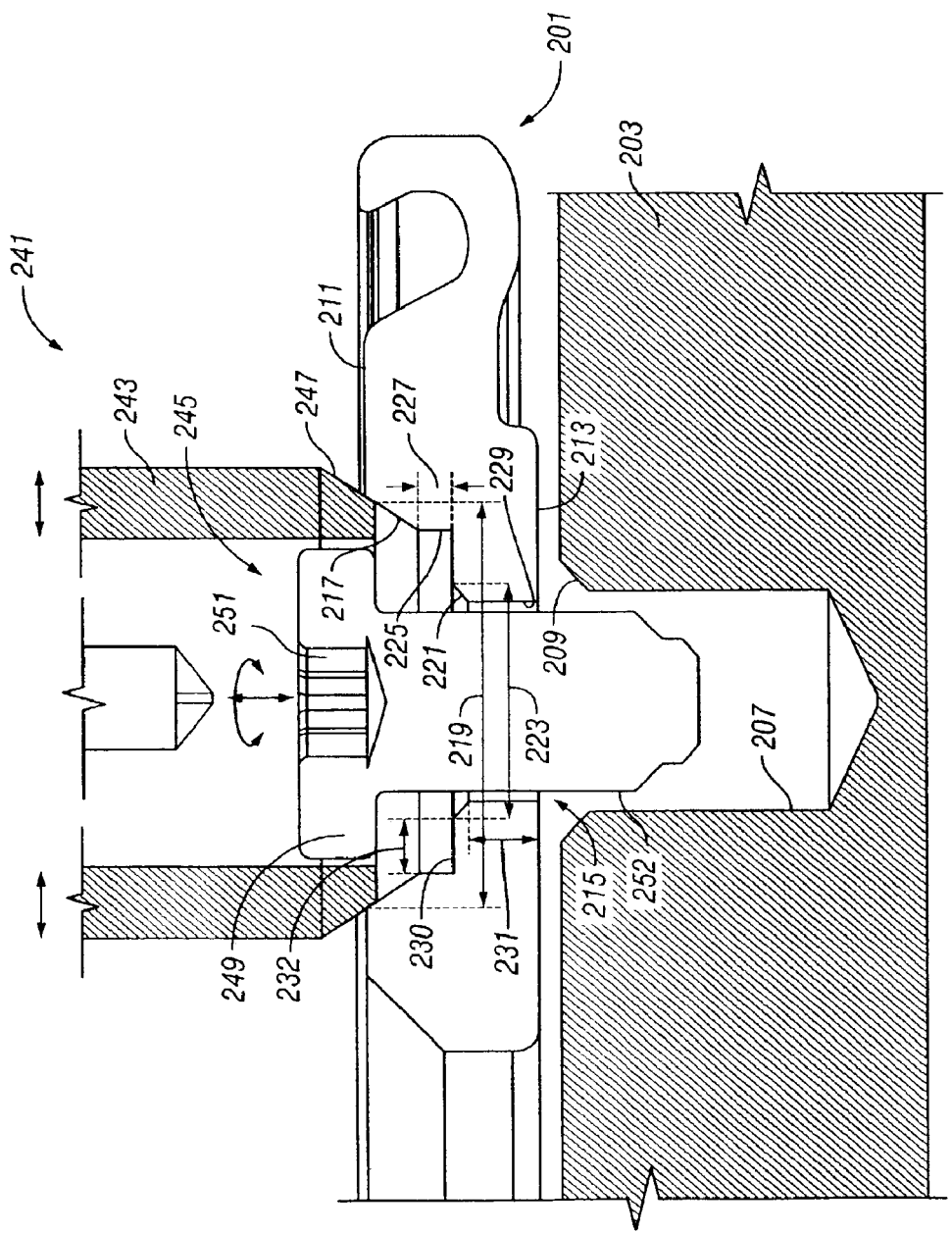
FIG. 5 is an enlarged sectional side view of a portion of the disk clamp of FIG. 2 being assembled to the hub of FIG. 4 and is constructed in accordance with the present invention.

As best shown in FIG. 5, each of the apertures 215 has a first countersink 217 with a first diameter 219 that is located adjacent to the first surface 211. Each of the apertures 215 also has a second countersink 221 with a second diameter 223 that is smaller than the first diameter 219. Second countersink 221 is actually a forced de-burr located between a shoulder 230 and a second axial bore 229. A first axial bore 225 having a first axial length 227 is located between the first and second countersinks 217, 221. The second axial bore 229 has a second axial length 231 that is greater than the first axial length 227 is located adjacent to the second surface 213 opposite the first countersink 217. In the embodiment shown, the shoulder 230 is formed and extends between first axial bore 225 and second countersink 221. Shoulder 230 is defined by a radial width 232 that is perpendicular to second axial bore 229 in the embodiment shown.

As shown in FIGS. 2 and 3, the disk clamp 201 also has a large central opening 233 and a disk clamping perimeter 235. For purposes of comparison only, disk clamp 201 is also shown with a plurality of conventional tool alignment holes 237. In the prior art, tool alignment holes 237 are needed to prevent disk clamps from being rotated while the disk clamps are being attached to the motor hubs. However, as will be described below, the disk clamp 201 constructed in accordance with the present invention has no need for such tool alignment holes.

The system of the present invention also comprises a disk clamp installation tool 241 for assembling the disk clamp 201 to the hub 203 of the spindle motor. The disk clamp installation tool 241 has a plurality of fastener sleeves 243 (one shown in FIG. 5) for gripping and dispensing individual ones of the fasteners 245. The fastener sleeves 243 are symmetrically spaced apart from each other and axially register with respective ones of the apertures 215 in the disk clamp 201, as shown. Each of the fastener sleeves 243 has an end 247 that is tapered and complementary in shape to the first countersinks 217 in the apertures 215 of the disk clamp 201. In one embodiment, the fasteners 245 comprise screws having heads 249 with drive features 251 and threaded shanks 252. In one embodiment, the disk clamp installation tool 241 simultaneously engages all of the apertures 215 in the disk clamp 201 with respective ones of the fasteners 245 to prevent displacement (e.g., rotation) of the disk clamp 201 relative to the hub 203 when the fasteners 245 are driven (e.g., torqued) through the apertures 215 and into the threaded holes 207 of the hub 203.

In operation (FIGS. 4 and 5), the present invention includes a method of preventing displacement or rotation of the disk clamp 201 while the disk clamp 201 is being assembled to the hub 203 of the spindle motor in the hard disk drive 111. The method comprises providing the hub 203 of the spindle motor with fastener holes 207, the disk clamp 201 with apertures 215 with countersinks 217 (and countersinks 221, in one embodiment), and the disk clamp tool 241 with fastener sleeves 243 that are complementary in shape to the countersinks 217. The disk clamp installation tool 241 is loaded with fasteners 245 such that each of the fastener sleeves 243 has a fastener 245. The disk clamp 201 is located and placed on the hub 203 such that the apertures 215 axially register with respective ones of the fastener holes 207. The method further comprises moving the fastener sleeves 243 and the disk clamp 201 and hub 203 toward each other, and centering and inserting the fasteners 245 in the fastener sleeves 243 in the countersinks 217 of the apertures 215 in the disk clamp 201. The fasteners 245 are driven or torqued into the fastener holes 207 in the hub 203 to assemble the disk clamp 201 to the hub 203 and thereby preventing rotation of the disk clamp 201 relative to the hub 203.

As described above, the fasteners 245 may comprise screws and the fastener holes 207 in the hub 203 maybe threaded such that the disk clamp installation tool 241 torques the screws into the threaded holes. The method may also comprise simultaneously centering and inserting the fasteners 245 in the countersinks 217, and simultaneously driving the fasteners 245 into the fastener holes 207. Furthermore, the method may comprise centering and inserting all of the fasteners 245 in all of the countersinks 217, and driving all of the fasteners 245 into all of the fastener holes 207, each step of which may occur simultaneously.

The present invention has several advantages. The disk clamp solves a number of problems over prior art designs by overcoming issues related to rotation and displacement of the clamp while it is being fastened to the hub of the spindle motor by providing a plurality of symmetrically spaced apart countersunk apertures in the top surface of the disk clamp. These apertures enable the disk clamp to maintain a proper orientation before the fasteners are attached. The present design also reduces the complexity of the tooling and fixtures required to complete the assembly. In addition, the overall part cost is reduced because additional, prior art tooling holes are no longer required. Moreover, less tooling complexity also allows multi-fastener driver systems to be employed so that all of the fasteners required to complete the assembly may be simultaneously attached and driven into the disk clamp. The countersunk apertures on the disk clamp are designed to couple with tapered sleeves on the installation tool to quickly and precisely center the fasteners in the disk clamp while providing anti-rotation torque for the disk clamp when the installation tool torques the fasteners.

While the invention has been shown or described in only some of its forms, it should be apparent to those skilled in the art that it is not so limited, but is susceptible to various changes without departing from the scope of the invention.

What is claimed is:

1. A system for preventing the displacement of a disk clamp while the disk clamp is being assembled to a hub of a motor in a hard disk drive, comprising:
   a hub of a motor having a plurality of holes formed therein;
   a disk clamp having a plurality of apertures extending therethrough, each of the apertures having an axis and axially registering with at least some of the holes in the hub and having a countersink formed therein;
   a disk clamp installation tool for assembling the disk clamp to the hub, the disk clamp installation tool having a plurality of fastener sleeves for dispensing fasteners, the fastener sleeves axially registering with respective ones of the apertures in the disk clamp, each of the fastener sleeves having an end that is tapered and complementary in shape to the countersinks in the apertures of the disk clamp; and
   the disk clamp installation tool simultaneously engaging at least some of the apertures in the disk clamp with respective ones of the fasteners to prevent displacement of the disk clamp relative to the hub when the fasteners are driven through the apertures and into the holes of the hub.

2. The system of claim 1, wherein all of the fasteners are centered and inserted in all of the countersinks, and all of the fasteners are driven into all of the holes.

3. The system of claim 1, wherein the fasteners are simultaneously centered and inserted into the countersinks, and the fasteners are simultaneously driven into the fastener holes to prevent rotation of disk clamp relative to the hub.

4. The system of claim 1, wherein each of the countersinks in the apertures has a first diameter, and each of the apertures has a second countersink with a second diameter that is smaller than the first diameter, a first axial bore having a first axial length and located between the first and second countersinks, and a second axial bore having a second axial length that is greater than the first axial length.

5. The system of claim 1, wherein the hub has a hub surface, the disk clamp has first and second opposed surfaces, and the second surface is located adjacent to the hub surface when the disk clamp is mounted to the hub.

6. The system of claim 1, wherein the hub has an axis, and the holes, the apertures, and the fastener sleeves are symmetrically spaced apart about the axis.

7. The system of claim 1, wherein the fasteners are screws, the holes in the hub are threaded, and the disk clamp installation tool torques the screws into the threaded holes.

8. The system of claim 1, wherein each of the apertures also has a shoulder formed therein, each of the shoulders having a radial width.

9. A system for preventing the displacement of a disk clamp while the disk clamp is being assembled to a hub of a spindle motor in a hard disk drive, comprising:
   a hub of a spindle motor having a hub surface, and a plurality of holes formed in the hub surface, the holes being symmetrically spaced apart from each other;
   a disk clamp having first and second opposed surfaces and a plurality of apertures extending therethrough, the apertures being symmetrically spaced apart from each other and axially registering with respective ones of the holes in the hub when the second surface of the disk clamp is positioned adjacent to the hub surface of the hub, each of the apertures having a first countersink with a first diameter and located adjacent to the first surface, a second countersink with a second diameter that is smaller than the first diameter, a first axial bore having a first axial length and located between the first and second countersinks, and a second axial bore having a second axial length that is greater than the first axial length and is located adjacent to the second surface opposite the first countersink;
   a disk clamp installation tool for assembling the disk clamp to the hub of the spindle motor, the disk clamp installation tool having a plurality of fastener sleeves for dispensing fasteners, the fastener sleeves being symmetrically spaced apart from each other and axially registering with respective ones of the apertures in the disk clamp, each of the fastener sleeves having an end than is tapered and complementary in shape to the first countersinks in the apertures of the disk clamp; and the disk clamp installation tool simultaneously engaging the apertures in the disk clamp with respective ones of the fasteners to prevent displacement of the disk clamp relative to the hub spindle motor when the fasteners are driven through the apertures and into the holes of the hub.

10. The system of claim 9, wherein the fasteners are screws, the holes in the hub are threaded, and the disk clamp installation tool torques the screws into the threaded holes.

11. The system of claim 9, wherein each of the apertures also has a shoulder formed and extended between the first axial bore and the second countersink, the shoulder being defined by a radial width.

12. A method of preventing displacement of a disk clamp while the disk clamp is being assembled to a hub of a spindle motor in a hard disk drive comprising:

(a) providing a hub of a spindle motor with fastener holes, a disk clamp having apertures with countersinks, and a disk clamp installation tool having fastener sleeves that are complementary in shape to the countersinks;

(b) loading the disk clamp installation tool with fasteners such that each of the fastener sleeves has a fastener;

(c) placing the disk clamp on the hub such that the apertures axially register with respective ones of the fastener holes;

(d) moving the fastener sleeves and the disk clamp and hub toward each other;

(e) centering and inserting the fasteners in the fastener sleeves in the countersinks of the apertures in the disk clamp;

(f) driving the fasteners into the fastener holes in the hub to assemble the disk clamp to the hub and thereby preventing rotation of the disk clamp relative to the hub.

13. The method of claim 12, wherein the fasted are screws, the fastener holes in the hub are headed, and the disk clamp installation tool torque the screws into the threaded holes.

14. The method of claim 12, wherein step (e) comprises simultaneously centering and inserting the fasteners in the countersinks, and step (f) comprises simultaneously driving the fasteners into the fastener holes to prevent rotation of the disk clamp relative to the hub.

15. The method of claim 12, wherein step (e) comprises centering and inserting all of the fasteners in all of the countersinks, and step (f) comprises driving all of the fasteners into all of the fastener holes.

* * * * *

UNITED STATES PATENT AND TRADEMARK OFFICE
CERTIFICATE OF CORRECTION

PATENT NO. : 6,874,219 B2  Page 1 of 1
DATED : April 5, 2005
INVENTOR(S) : Steven Alf Hanssen et al.

It is certified that error appears in the above-identified patent and that said Letters Patent is hereby corrected as shown below:

<u>Title page,</u>
Item [57], ABSTRACT,
Line 11, please replace the word "arid" with the word -- and -- after the word "attached".

Signed and Sealed this

Sixteenth Day of August, 2005

JON W. DUDAS
*Director of the United States Patent and Trademark Office*